United States Patent [19]
Fisher et al.

[11] Patent Number: 5,969,705
[45] Date of Patent: Oct. 19, 1999

[54] MESSAGE PROTOCOL FOR CONTROLLING A USER INTERFACE FROM AN INACTIVE APPLICATION PROGRAM

[75] Inventors: Stephen Fisher, Menlo Park; Eric Mathew Trehus, Milpitas, both of Calif.

[73] Assignee: Apple Computer, Inc., Cupertino, Calif.

[21] Appl. No.: 08/816,492

[22] Filed: Mar. 13, 1997

Related U.S. Application Data

[63] Continuation of application No. 08/312,437, Sep. 26, 1994, abandoned, which is a continuation of application No. 08/084,288, Jun. 28, 1993, abandoned.

[51] Int. Cl.[6] .................................................. G09G 5/00
[52] U.S. Cl. ........................................... 345/114; 345/345
[58] Field of Search ..................................... 345/119, 120, 345/118, 113, 114, 115, 343, 344, 345, 346, 347, 348; 395/155, 156, 157, 158

[56] References Cited

U.S. PATENT DOCUMENTS

| | | |
|---|---|---|
| 4,313,113 | 1/1982 | Thornburg . |
| 4,484,302 | 11/1984 | Cason et al. . |
| 4,555,775 | 11/1985 | Pike . |
| 4,688,167 | 8/1987 | Agarwal . |
| 4,698,624 | 10/1987 | Barker et al. . |

(List continued on next page.)

OTHER PUBLICATIONS

"Notebook Tabs as Target Location for Drag/Drop Operations",IB, vol. 35, No. 7, Dec. 1992.
Microsoft Corporation, "Microsoft Windows Paint User's Guide," Version 2.0, 1987, pp. 8–10, 44–45.
Microsoft Corporation, "Microsoft Windows Write User's Guide," Version 2.0, 1987, pp. 60–65.
Microsoft Corporation, "Microsoft Word: Using Microsoft Word", Version 5.0, 1989, pp. 69, 88–93.
Screen Dumps from Microsoft Windows V 3.1, Microsoft Corporation 1985–1992 (14 pages).
WordPerfect for Windows V 5.1, WordPerfect Corporation, 1991 (16 pages).
Jeffrey M. Richter, "Implementing Drag–and–Drop," *Windows 3.1: A Developer's Guide*, 2nd Edition, M&T Books, A Division of M&T Publishing, Inc. (1992), pp. 541–577 (Chapter 9).
Charles Petzold, "Windows™ 3.1—Hello to TrueType™, OLE, and Easier DDE; Farewell to Real Mode," *Microsoft Systems Journal*, vol. 6, No. 5 Sep. 1991, pp. 17–26.
Jeffrey Richter, "Drop Everything: How to Make Your Application Accept and Source Drag–and–Drop Files," *Microsoft Systems Journal*, vol. 7, No. 3, May/Jun. 1992, pp. 19–30.
Future Enterprises Inc., A Microcomputer Education Course for: U.S. Department of Commerce "Studen Workbook for Quattro Pro 3.0—Concepts and Basic Uses," 1991 (3 pages).
Inside Macintosh, vol. VI, 1991, pp. 5–1 to 5–117.
Microsoft Windows 3.1, Step by Step, 1991, pp. 168–170.
Apple Computer, Inc., *Inside Macintosh, vol. VI* Table of Contents, 5–1 through 6–117 (1991).

*Primary Examiner*—Chanh Nguyen
*Attorney, Agent, or Firm*—Blakely, Sokoloff, Taylor & Zafman

[57] ABSTRACT

Method and apparatus for a first process operative in a computer system controlling a user interface on a computer system display under control of a second process operative in the computer system. An event handler is installed for the second process, the event handler servicing events generated for controlling the user interface display under control of the second process. The first process may then perform a first set of functions in the computer system. The first process generates events for controlling the user interface display, the events related to the functions performed by the first process. The event handler receives the events generated by the first process and updates the user interface on the computer system display according to the events generated by the first process and received by the event handler.

1 Claim, 7 Drawing Sheets

U.S. PATENT DOCUMENTS

| | | |
|---|---|---|
| 4,698,625 | 10/1987 | McCaskill . |
| 4,720,703 | 1/1988 | Schnarel, Jr. et al. . |
| 4,780,883 | 10/1988 | O'Connor et al. . |
| 4,831,556 | 5/1989 | Oono . |
| 4,862,376 | 8/1989 | Ferriter et al. . |
| 4,868,765 | 9/1989 | Diefendorff . |
| 4,905,185 | 2/1990 | Sakai . |
| 4,922,414 | 5/1990 | Holloway et al. . |
| 4,954,967 | 9/1990 | Takahashi . |
| 5,047,930 | 9/1991 | Martens et al. . |
| 5,079,695 | 1/1992 | Dysart et al. . |
| 5,140,677 | 8/1992 | Fleming et al. . |
| 5,157,763 | 10/1992 | Peters et al. . |
| 5,196,838 | 3/1993 | Meier et al. . |
| 5,202,828 | 4/1993 | Vertelney et al. . |
| 5,214,756 | 5/1993 | Franklin et al. . |
| 5,226,117 | 7/1993 | Miklos . |
| 5,226,163 | 7/1993 | Karsh et al. . |
| 5,228,123 | 7/1993 | Heckel . |
| 5,260,697 | 11/1993 | Barrett et al. ............................ 345/173 |
| 5,287,448 | 2/1994 | Nicol et al. . |
| 5,301,268 | 4/1994 | Takeda . |
| 5,305,435 | 4/1994 | Bronson . |
| 5,333,256 | 7/1994 | Green et al. . |
| 5,339,392 | 8/1994 | Risberg et al. . |
| 5,341,293 | 8/1994 | Vertelney et al. . |
| 5,371,844 | 12/1994 | Andrew et al. . |
| 5,371,851 | 12/1994 | Pieper et al. . |
| 5,400,057 | 3/1995 | Yin . |
| 5,422,993 | 6/1995 | Fleming . |
| 5,442,742 | 8/1995 | Greyson et al. . |

MESSAGE PROTOCOL FOR CONTROLLING A USER INTERFACE FROM AN INACTIVE APPLICATION PROGRAM

This is a continuation of application Ser. No. 08/312,437, filed Sep. 26, 1994, now abandoned, which is a continuation of application Ser. No. 08/084,288, filed Jun. 28, 1993 status: abandoned.

BACKGROUND OF THE INVENTION

1. Field of the Invention

The present invention relates to user interface control in a computer system. More specifically, the present invention relates to a messaging protocol which allows one application program to specify the appearance of an interface of a computer system while under control of a second application program.

2. Background Information

In multitasking operating systems, such as the Macintosh brand System 7.0 operating system available from Apple Computer, Inc. of Cupertino, Calif., typically, only one application program is given complete control of the user interface in order to prevent conflicts. There are circumstances, however, in which an application program which does not currently have control of the user interface will require that some information be presented to a user of the computer system. Typically, in the prior art, in these situations, the "inactive" application program must be "brought to the front" or made the active application (one in control of the user interface) in order for user interface control to become available to the application program. If events or other activities occur within the process that does not have control of the user interface, then the user may not be informed of the activity until after the activity has taken place, when the user brings the background application to the front. There are some circumstances in which the delay between the occurrence of the action within the background process, and the failure to provide feedback upon the computer system display may pose a substantial problem. For example, data may be overwritten, the user may wish to abort the task being performed, or he may wish to take corrective measures to otherwise address the activity occurring in the background task. There thus has arisen a need for background process to control the user interface which is currently under control of an "active" or foreground process within a computer system.

Another situation which frequently occurs is when one application program requires a complex service such as a file copying mechanism, but yet does not possess the necessary code in order to perform these tasks. An active application can use the services of the inactive application's processes without possessing the necessary code, and the inactive application program may drive the user interface of the "active" application program in order to provide feedback that the complex operation is taking place. Unfortunately, prior art techniques have no mechanism for allowing this to take place.

SUMMARY AND OBJECTS OF THE PRESENT INVENTION

One of the objects of the present invention is to allow a background application to provide user interface feedback when it is not the currently active application program.

Another of the objects of the present invention is to provide a protocol wherein a background application program may direct a foreground application program to control its user interface in a specified way.

Another of the objects of the present invention is to allow a background application program to communicate with a foreground application program for controlling the user interface of a computer system display.

Another object of the present invention is to allow a foreground application program controlling a user interface to take advantage of the services of a background application program.

Method and apparatus for a first process operative in a computer system controlling a user interface on a computer system display under control of a second process operative in the computer system. An event handler is installed for the second process, the event handler servicing events generated for controlling the user interface display under control of the second process. The first process may then perform a first set of functions in the computer system, in one embodiment, such as file management functions (e.g. copying and/or moving of files in the file system). The first process generates a first set of events for controlling the user interface display, the first set of events related to the first set of functions performed by the first process. For example, in various embodiments, feedback may be given about the progress of the file management functions (such as copying/moving specific files, reading from a source, and copying to a destination). The event handler receives the first set of events generated by the first process and updates the user interface on the computer system display according to the events generated by the first process and received by the event handler. This may include, showing the progress of the file management operation, and alerting the user of any abnormal conditions.

Other features, objects, and advantages of the present will become apparent from viewing the figures and the description below.

BRIEF DESCRIPTION OF THE DRAWINGS

The present invention is illustrated by way of example and not limitation in the figures of the accompanying in which like references indicate like elements and in which.

DETAILED DESCRIPTION

The present invention relates to a messaging protocol between processes and a computer system wherein a first process (e.g., a client process) sends messages to a second process (e.g., a server process) so that the client process can direct the appearance of the user interface under control of the server process. In this manner, the client process performs certain functions, and the server process controls all user interface functions such as the display of feedback for those functions. For the remainder of this application, various process steps, apparatus, data structures, message formats, events, parameters, and other information will be discussed in detail, however, these are merely for illustrative purposes and are not intended to limit the present invention. It can be appreciated by one skilled in the art that many departures and modifications may be made from these specific embodiments without departing from the overall spirit and scope of the present invention.

Figure 1:
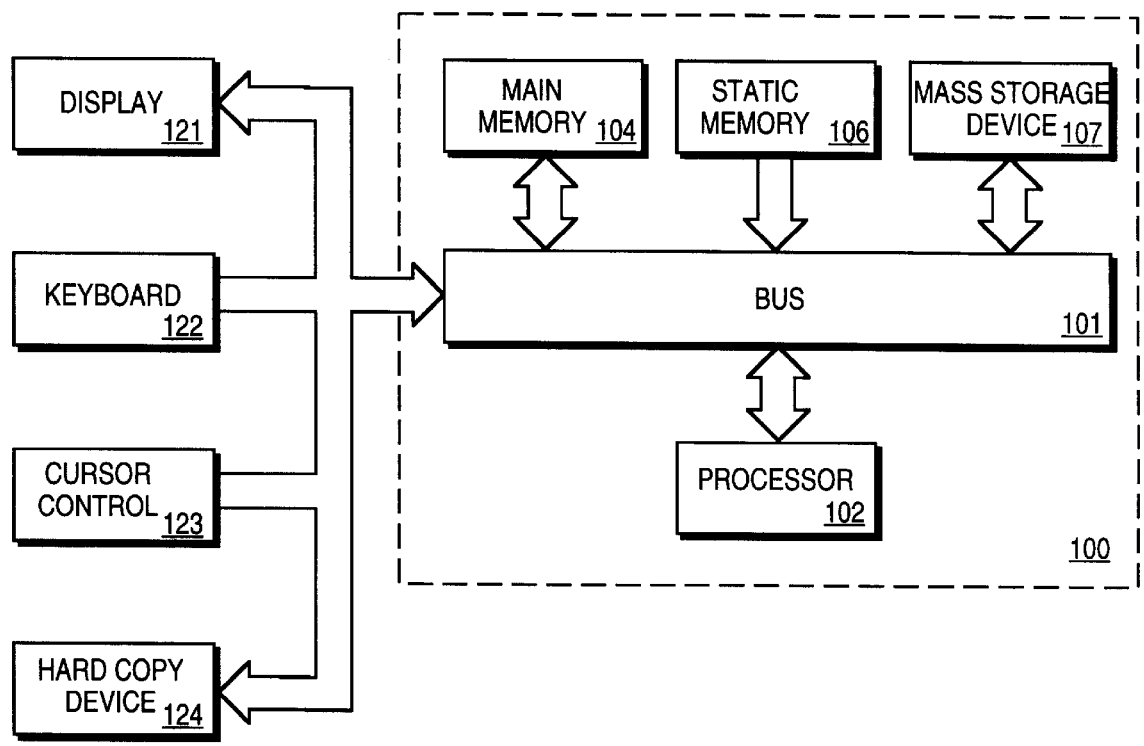
FIG. 1 shows an example of a computer system architecture upon which one embodiment of the present invention may be implemented.

Referring to FIG. 1, a system upon which one embodiment of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Note, also, that any or all of the components of system 100 and associated hardware may be used in various embodiments, however, it can be appreciated that any configuration of the system may be used for various purposes as the user requires.

In one embodiment, system 100 is one of the Macintosh® family of personal computers such as the Macintosh® Quadra™ or Macintosh® Performa™ brand personal computers manufactured by Apple® Computer, Inc. of Cupertino, Calif. (Apple, Macintosh, Quadra, and Performa are trademarks of Apple Computer, Inc.). Processor 102 may be one of the 68000 family of microprocessors, such as the 68030 or 68040 manufactured by Motorola, Inc. of Schaumburg, Ill.

Note that the following discussion of various embodiments discussed herein will refer specifically to a series of routines which are generated in a high-level programming language (e.g., the C++ language available from Symantec of Cupertino, Calif.) and compiled, linked, and then run as object code in system 100 during run time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Graphical User Interface

Before discussing the preferred embodiment in detail, a brief overview of the user interface used in this system is required. A "windowing" or graphical user interface (GUI) operating environment is used wherein selections are performed using a cursor control device such as 123 shown in FIG. 1. Typically, an item is "selected" on a computer system display such as 121 using cursor control device 123 by positioning a cursor, or other indicator, on the screen over (or in proximity to) an object on the screen and by depressing a "selection" button which is typically mounted on or near the cursor control device. The object on the screen is often an icon which has an associated file or operation which the user desires to use in some manner. In order to launch a user application program, in some circumstances, the user merely selects an area on a computer display represented as an icon by "double clicking" the area on the screen. A "double click" selection is an operation comprising, while positioning the cursor over the desired object (e.g., an icon), two rapid activations of the selection device by the user. "Pull-down" or "pop-up" menus are also used in the preferred embodiment. A pull-down or pop-up menu is a selection which is accessible by depressing the selection button when the cursor is pointing at a location on a screen such as a menu bar (typically at the top of the display), and "dragging" (moving cursor control device 123 while the selection button is depressed) until the selection the user wishes to access is reached on the pull-down menu. An item is indicated as being "selected" on a pull-down menu when the item is highlighted or displayed in "reverse video" (white text on a black background). The selection is performed by the user releasing the selection device when the selection he wishes to make is highlighted. Also, in some GUI's, as is described in the background above, the "selection" and "dragging" of items is provided to move files about in the file system or perform other system functions. These techniques include "dragging and dropping" which comprises making a "selection" of an icon at a first location, "dragging" that item across the display to a second location, and "dropping" (e.g., releasing the selection device) the item at the second location. This may cause the movement of a file to a subdirectory represented by the second location.

Note also that GUI's may incorporate other selection devices, such as a stylus or "pen" which may be interactive with a display. Thus, a user may "select" regions (e.g., an icon) of the GUI on the display by touching the stylus against the display. In this instance, such displays may be touch or light-sensitive to detect where and when the selection occurs. Such devices may thus detect screen position and the selection as a single operation instead of the "point (i.e., position) and click (e.g., depress button)," as in a system incorporating a mouse or trackball. Such a system may also lack a keyboard such as 122 wherein the input of text is provided via the stylus as a writing instrument (like a pen) and the user handwritten text is interpreted using handwriting recognition techniques. These types of systems may also benefit from the improved manipulation and user feedback described herein.

Figure 2:
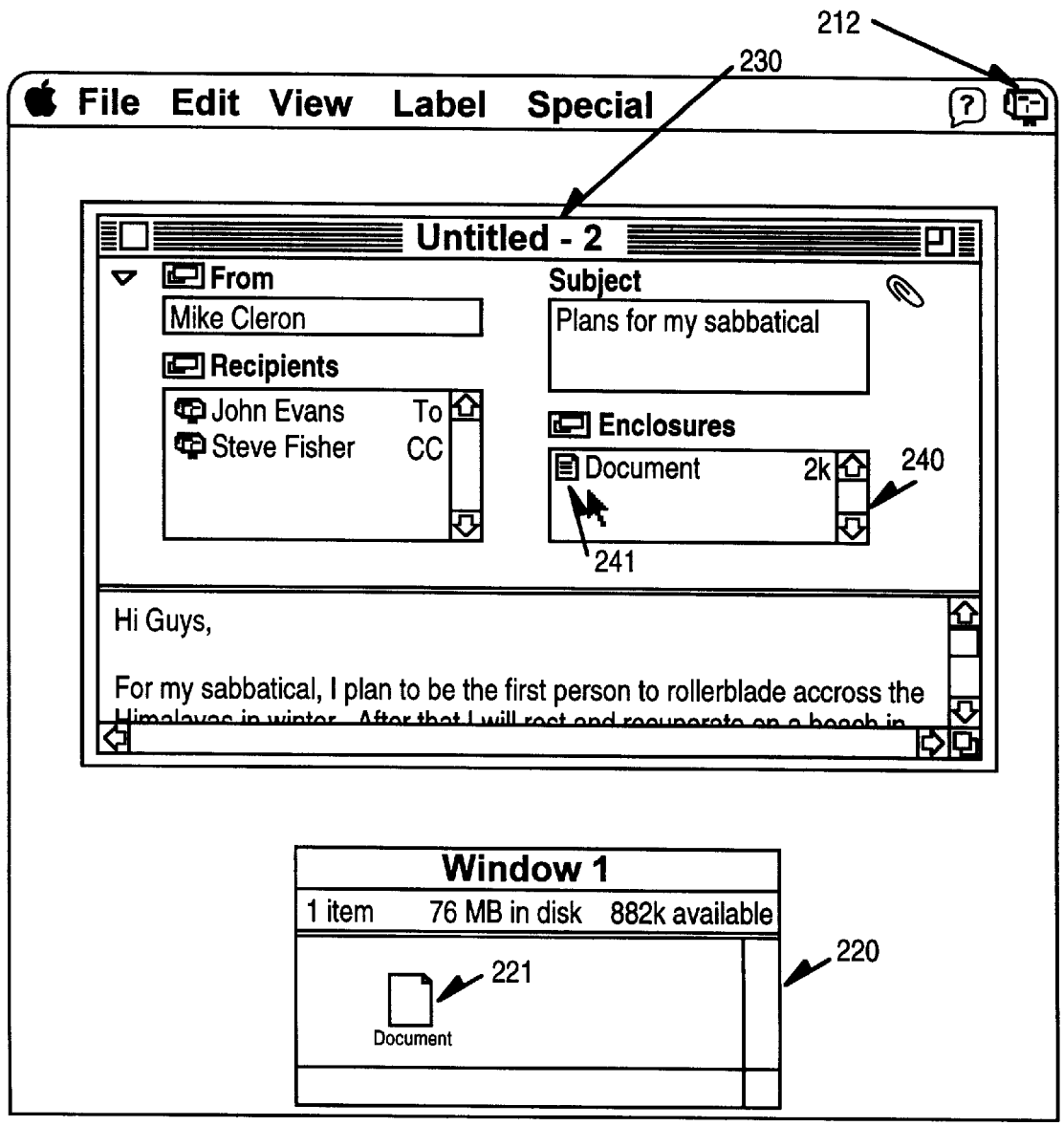
FIG. 2 shows a situation in which a file system manipulation may be performed when the filed management task is not the "active" application program (the program controlling the user interface).

One problem solved by the present invention is illustrated with reference to FIG. 2. Window 200 of FIG. 2 illustrates a typical Macintosh user interface display while one application program, such as an electronic mail program, controls the user interface display. This is illustrated by the icon present in the upper right-hand portion 212 of the display 200. The operating system only allows a single application program to control the user interface at any given time. However, other application programs such as, those performing file and/or program management functions (e.g., the "Finder" within the Macintosh brand operating system), allow the launching of applications, programs, and the movement of files within the file system. In one embodiment of the present invention, a user may decide to "enclose" a file represented by icon 221 in the file system with the mail message represented on window 230. The application program controlling window 230 does not possess file transfer or file transfer feedback capabilities, whereas the File System Manager (known as the "Finder" in the Macintosh) does possess these capabilities. Therefore, it is desired that the application program controlling window 230 have certain functions and user interface capabilities of the Finder. In a typical prior art systems, feedback is provided by the file management function to show that the file movement or copy operation is taking place. This typically takes the form of a progress bar on a typical prior art user interface to show the progression of the file transfer operation as it takes place in the file system. For example, if a plurality of files are moved in the file system, or copied from one media device to another, file names showing each transfer of each file, and a darkened representation is shown in the progress bar to show overall completion of the copying of the files is represented on the progress bar. This will be illustrated in more detail below.

Event-Driven Architecture

An operation such as copying or moving files from one location to another in the file system is a nontrivial task. In this embodiment, the application program controlling the user interface defers to the background task the "Finder" so that it may perform the file management functions for transfer and/or copy of the file(s). For example, several tasks need to be performed by the copy/movement process prior to copying or moving the files. For example, the destination subdirectory or other file location needs to be scanned to determine whether any of the transferred file names are equivalent to those already in the subdirectory. If so, the user needs to be alerted in order to determine whether he wishes to overwrite the existing files at that location or, perhaps, use a different name. In another instance, there may not be sufficient space at the destination to which the files are being moved for writing the files. In this instance, the user is alerted that there was not sufficient space on the storage medium to store the files, is informed that the operation was not successful, and any file(s) already written or other intermediate file information can be deleted. However, in a situation such as that illustrated in FIG. 2, the underlying file management process cannot present this user feedback or alert information to the user because it does not presently have control of the user interface. The process having control of window 230, an electronic mail application program, is currently in control of the user interface. Thus, an improved means for allowing the background process (e.g., the Finder) to control the user interface is used in various embodiments of this invention to present feedback to the user regarding the underlying functions that are taking place. This is performed via interprocess communication, in the Macintosh brand operating system, using Events and the accompanying operating system Event Manager and Apple Event Manager available from Apple Computer of Cupertino, Calif.

Interprocess communication is an important aspect of modern computer system design. For example, such interapplication communication has provided in modern computer systems, such as the Macintosh brand computer's operating System 7.0, available from Apple Computer of Cupertino Calif., through a mechanism known as the Event Manager. The Event Manager and the Apple Event Manager are used for handling a wide variety of functions within application programs such as detecting user actions—key clicks, selections using a cursor control device, the detection of the insertion of disks into a disk drive on the computer system, opening files, closing files, or other actions within the computer system. Typically, processes running within a Macintosh brand computer system comprise a main program loop known as an "event" loop which detect the occurrence of these events in the system. Then, the application typically branches to portions of the program to allow the event to be serviced. Such an event driven architecture forms the core of many application programs within many different types of computers and operating systems in present use but, in this embodiment, resides in a system such as 100 described above.

Figure 3:
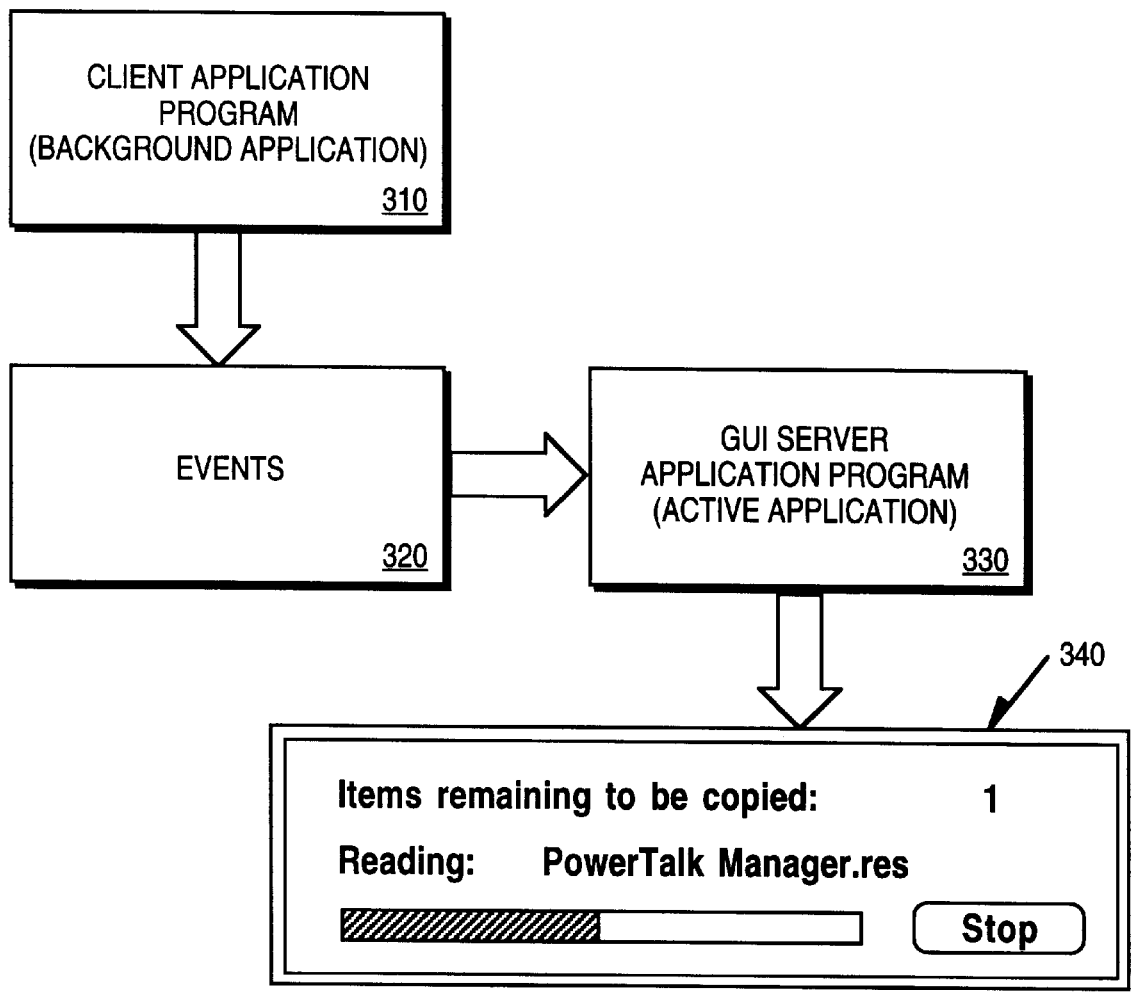
FIG. 3 shows an event-driven architecture which is used in one embodiment of the present invention for allowing a background task to control a user interface of a foreground application program.

Various embodiments of the present invention use the Event Manager and the Apple Event Manager supplied by Apple Computer for interprocess communication between applications programs which are operative within computer system 100 during run time to implement the features described herein. The event driven architecture for message passing between a first application program (e.g., a client application program which is operative in the background), and a second application program (e.g., a server application program which is the active application controlling the user interface), is illustrated with reference to FIG. 3. For example, using the event driven architecture specified in *Inside Macintosh, Volume* 6, pages 5–1 through 6–118, "client" application program 310 communicates with the Graphical User Interface (GUI) "server" application program or active application program 330 via events 320. Each of these events are generated by the client application program 310 and are detected by the Apple Event Manager. GUI server application 330 registers a process with the Apple Event Manager known as an Event Handler so that whenever defined events are detected, the Apple Event Manager forwards the event(s) to the registered handler(s) and cause the handler(s) to be invoked and service the events. At that point, the handler may determine the appropriate action to take place. In various embodiments of the present invention described herein, the registered event handler for GUI server 330 will cause the activation and modification of a user interface display, in this case, copy window 340 illustrated in FIG. 3. Upon the launching of the GUI server application program 330, or any application program which may become an active application program during specified user actions (e.g., the copying of file(s), the server application program will register with the Apple Event Manager the handler(s) which are used to service the events, including those generated by any potential client application programs (e.g., 310 of FIG. 3). In the situation where a defined event is not serviced by any handler which are registered by the application program, then, a default handler supplied by the operating system is instead used for servicing the events.

For the remainder of this application, in the embodiment discussed herein, it will be assumed that the "server" (e.g., 330 of FIG. 3) has registered a handler which will service user interface events. It will also be assumed that a client program (e.g., 310 of FIG. 3) provides the underlying functionality for performing the actions represented by the user interface (e.g., copying files), which occurs upon the inactive program detecting that a file should be copied (or moved) from one directory to another, such as a directory for "Enclosures" within an electronic mail application program. This function may also be requested by server process 330 sending an event to a handler registered for client process 310, such as "CopyFile" 'File 1' to 'Enclosures.'" The mechanics of this operation, however, will not be described in detail because they are beyond the scope of the present invention.

Client to Server Events for Controlling the User Interface

The following events are defined in this new protocol for communicating from client 310 to user interface server 330:

1. NewCopyWindow;
2. DisposeCopyWindow;
3. ChangeString;
4. ChangeBar; and
5. PresentAlert.

As client application program 310's file copy operations progress, certain of these events are issued by client process 310 to server process 330. Moreover, communication is provided via another set of events from server 330 to client 310 to indicate the success of the action indicated by the events, and user interface feedback in response to information presented on the user interface by server 330. A description of each of the specific events and the parameters used in each of these events will now be discussed with reference to FIG. 4.

Figure 4:
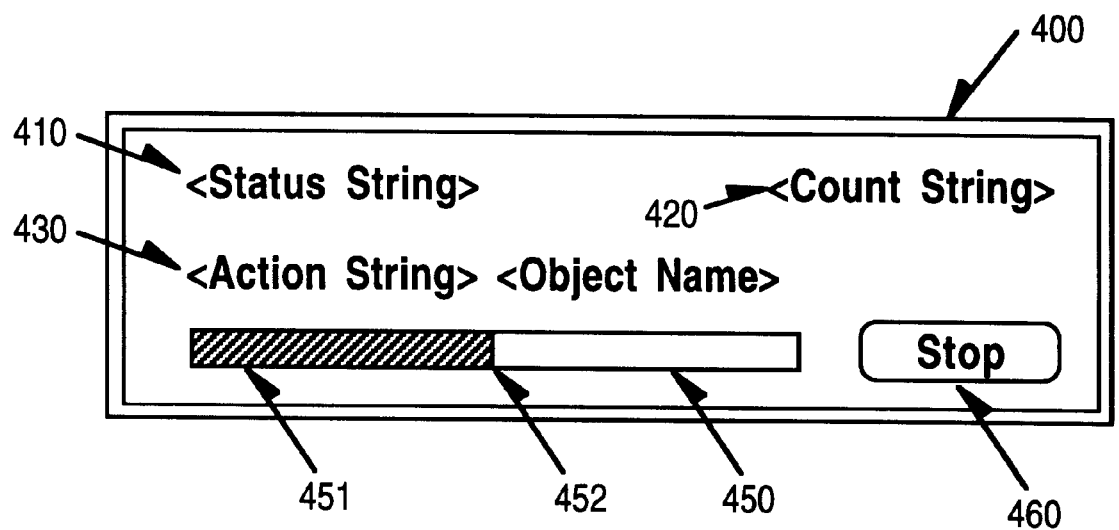
FIG. 4 shows an example of user interface display which may be controlled directly by a foreground application program or "server" process, but which may be directed by and whose functionality may be provided for by a background process (or "client").

400 of FIG. 4 illustrates a typical copy window which is displayed during a file copying operation well known in the prior art. However, each of the informative portions of the window are displayed with corresponding parameter name for the event in angled brackets (e.g., <status string> 410, <action string> 430, <count string> 420, and <object name> 440 ), which is replaced by the strings specified within parameters associated with the event(s) issued by client process 310. The events and parameters associated with the events will now be discussed.

NewCopyWindow

The NewCopyWindow event is signaled by client application program 310 to indicate that a new copy window (e.g., 400 in FIG. 4) should be displayed. Using typical prior art user interface commands, the server application program's handler creates upon the display screen a copy window 400 as is illustrated in FIG. 4 with the appropriate strings specified in the event parameters. Each of the event parameters for the NewCopyWindow are specified in the following order:

1. actionString (e.g., "reading"/"writing"/"verifying")
2. objectName (name of object being copied)
3. statusString (e.g., "Preparing To Copy," "Items remaining," etc.)
4. countString (how many items are being copied)
5. progressValue (an initial value, usually 0)
6. progressMax (a maximum value)

actionString is used for specifying the operation being performed. In typical prior art copy operations, the value thus is one of the following three strings: "Reading"; "Writing"; or "Verifying", for specifying the operation being performed. The specified action string is placed into region 430 of the copy window 400 upon detection of the NewCopyWindow event.

objectName is used for specifying the string which will appear at region 440 on copy window 400. It is used for specifying the name of the object or file being copied. Feedback can thus provide to the user which object is currently in the process of being read, written, or verified.

statusString 410 is used to specify the intermediate status of the copy operation taking place. For example, in certain prior art systems, this string may read "Preparing to Copy," "Items Remaining," etc. The status string indicates to the user the current status of the copy operation taking place.

countString is used for specifying the value which is shown at region 420 of display 400, such as the number of items (e.g., files or bytes) which are being copied. Thus, in one situation, this string may contain "120 bytes" when a file or file(s) of 120 bytes in length are being copied.

progressvalue and progressMax are used for specifying the status of progress bar 450. For example, the progressMax parameter is used for specifying some maximum value at which the progress bar will be completely darken. In an instance where a total of 120 bytes are being copied, progressMax may be equal to an integer value, such as 120. The progressValue parameter will thus be used to specify an intermediate value from some initial value (in one embodiment, the integer 0) to the progressMax value. Thus, on the display, progress bar 450 may be filled with a darkened region 451 up to an intermediate position 452 based upon the fraction progressValue/progressMax. For example, if progressValue equals 60 and progressMax equals 120, then progress bar 450 will have a representation such as that shown in FIG. 4 wherein 60/120 or ½ of the progress bar has been darkened. Feedback is thus provided to the user to illustrate the current completion of the copy operation. In typical situations, the progressvalue will have an initial value such as 0, and the progressMax value will be some nonzero value, for example, equivalent to an integer representing the maximum number of bytes to be copied.

DisposeCopyWindow

The DisposeCopyWindow event is used for indicating the termination of a copy operation. This event causes the server's handler to remove window 400 from the display using well known prior art interface techniques. The event has no parameters because it merely removes from the display the currently displayed progress bar window.

ChangeString

The ChangeString event has the following parameters:

stringNumber
    statusString = 0
    countString = 1
    actionString = 2
    objectNameString = 3
stringValue stringNumber—For each of the above specified values of stringNumber, the identified string modified in copy window 400 using the ChangeString event according to the string contained in stringValue. statusString 410, countString 420, actionString 430, or objectNameString 440 may be modified within, copy window 400 illustrated in FIG. 4. The client application may thus cause updates to be performed within copy window 400 so that the user is informed of the current status of the copy operation (such as a current file being copied)

stringValue is a string which will replace the string specified by the integer value contained in stringNumber.

ChangeBar

The ChangeBar event has the following parameters:

progressValue (a current value)

progressMax (a maximum value) Each of these parameters are integer values specifying the current progression and the maximum progression of progress bar 450 of copy window 400, is discussed with reference to the NewCopyWindow event above. The progress bar is thus adjusted to have a filled in representation, such as that shown as 451 according to the fraction progressValue/progressMax. The progress bar is update by the server's handler using standard prior art user interface commands.

PresentAlert

The following parameters are defined for the PresentAlert event:

```
alertType
    GenericAlert = 0
    NoteAlert = 1
    Confirm/Cancel = 2
    Continue/Cancel = 3
    CancelDefaultConfirm = 4
    SaveChanges = 5
alertString
``` alertType is an integer value which is used for specifying the type of alert displayed which is displayed to the user. Note that these alerts are all similar to those which are displayed in typical prior art copy operations upon detection of certain conditions, abnormal or otherwise. Some of these specified alerts require that the user respond. For example, the Confirm/Cancel alert displays a window which requests that the user "confirm" or "cancel" an ongoing operation. For example, the Confirm/Cancel alert may be used when the same file name is detected at a destination directory for a file which is being copied. Any of the standard alert windows which may be used in certain prior art copy operations may be specified using the proper alertType integer value. User responses to alerts will be provided with events from user interface server 330 to client 310 via another set of events discussed below.

alertString is a string value indicating the associated message to be associated with the alert. For example, the client application program may determine that a file name having an equivalent file name to a file being copied already resides at the destination application. In this event, the alertString may contain a message such as "File 'My File' already exists. Replace?" In any event, using the foregoing alert parameters, the PresentAlert event may specify appropriate alerts to the user.

Server to Client Events

All of the above events are shown for illustrative purposes only and are for the client application process 310 (e.g., the "Finder" performing the copy operation) alerting server process 330 (e.g., an electronic mail application program) to change the user interface display in a specified manner. However, other events may also be defined to specify other changes to the user interface display and for other operations, especially in instances where user interface response(s) to alerts are required. Because the background process (e.g., client process 310 ) cannot detect user interface actions (such as selections on the display), the handler for server process 330 must detect these actions and transmit response event messages to client process 310. In this case, client 310 will have its own event handler registered for servicing events issued by server 330 to client 310. For example, if the user wishes to "cancel" an operation, an event entitled "CopyCancel" may be issued to the client process 310 in one embodiment of the present invention so that any ongoing operation(s) may be aborted. This is detected by a user selecting "Stop" button 460 at any time during the operation. The cancel operation may be detected by server 330 by the detection of a "mouseDown" event at a specific location, such as "Stop" button 460, or its keyboard equivalent (e.g., a command period combination in the Macintosh). In this case, client application 310's handler may be alerted that an abort was indicated and take appropriate action.

In another embodiment, responses to alerts such as file overwrite messages may be sent from server 330 to client 310. In this instance, an integer may be passed as a parameter wherein one value of the integer (e.g., 0) causes the operation to be aborted or a second value (e.g., 1) causes the file overwrite to be confirmed. Responses to alerts are performed using other defined events from GUI server 330 to client 310. The user may be presented with the option of either confirming replacement of the file or canceling the copy operation. In one embodiment, when an alert is presented, client 310 remains idle until a response is made by a user on the user interface display. Then a corresponding response event (e.g., AlertReply) with a response parameter (e.g., an integer value Result containing an integer 0 indicating confirmation of the operation or integer 1 indicating canceling of the operation) is generated by server 330 to client 310 to either confirm or cancel the operation being performed by client 310.

Other user responses to queries, such as alerts, errors, or other conditions, may also be responded to in this manner, as detected by GUI server 330 and sent to client 310 via a registered handler.

Event Handling by Server Application Program

FIGS. 5a–5g show a process flow diagram of a typical event handler which may be registered by server application program 330 and service events generated by a background process for controlling the user interface using the messaging protocol of one embodiment of the present invention. For example, such an event handler may be registered using the Apple Event Manager described in *Inside Macintosh, Volume VI*, Chapter 6, wherein all of the above-described events are handled by this single handler 500. Handler 500 will typically have a process entry point, such as 501 illustrated in FIG. 5a, and comprise an IF or CASE programming statement in a typical high level programming language or other condition checking loop, which is illustrated in the remainder of the figures. Then, each of the events may be checked for, and upon detection of a specific event, the user interface display specified by the event and associated parameters may be displayed upon system display 121. For example, it will be determined at step 502 whether a NewCopyWindow event has been detected. If so, then a new copy window (e.g., 400) is displayed at step 503 with the specified parameters, such as statusString 410, countString 420, actionString 430, objectName 440 , and having the progress bar 450 with an appropriate representation as defined by the progressValue/progressMax parameters passed within the event. Upon display of the new copy window 400 at step 503, process 500 continues and returns at step 517.

If, however, a NewCopyWindow event was not detected at step 502, and a window is not currently displayed as detected at step 504, then an error condition may be indicated at step 505, such as by issuing an event from server 330 to client 310 to specify an error (e.g., "EventNotHandled") to specify that the event was not serviced. Then, event handler 500 may exit at step 517. If, however, a window has already been displayed, then the condition for the various remaining events defined in the messaging protocol may be checked for using a suitable programming construct such as a CASE statement or other similar condition-checking statement(s). For example, it is determined at step 506 whether the DisposeCopyWindow event has been detected. If so, then the copy window displayed upon computer system display 121 is eliminated at step 507 using well-known prior art user interface operations, and handler 500 returns at step 517.

Figure 5A:
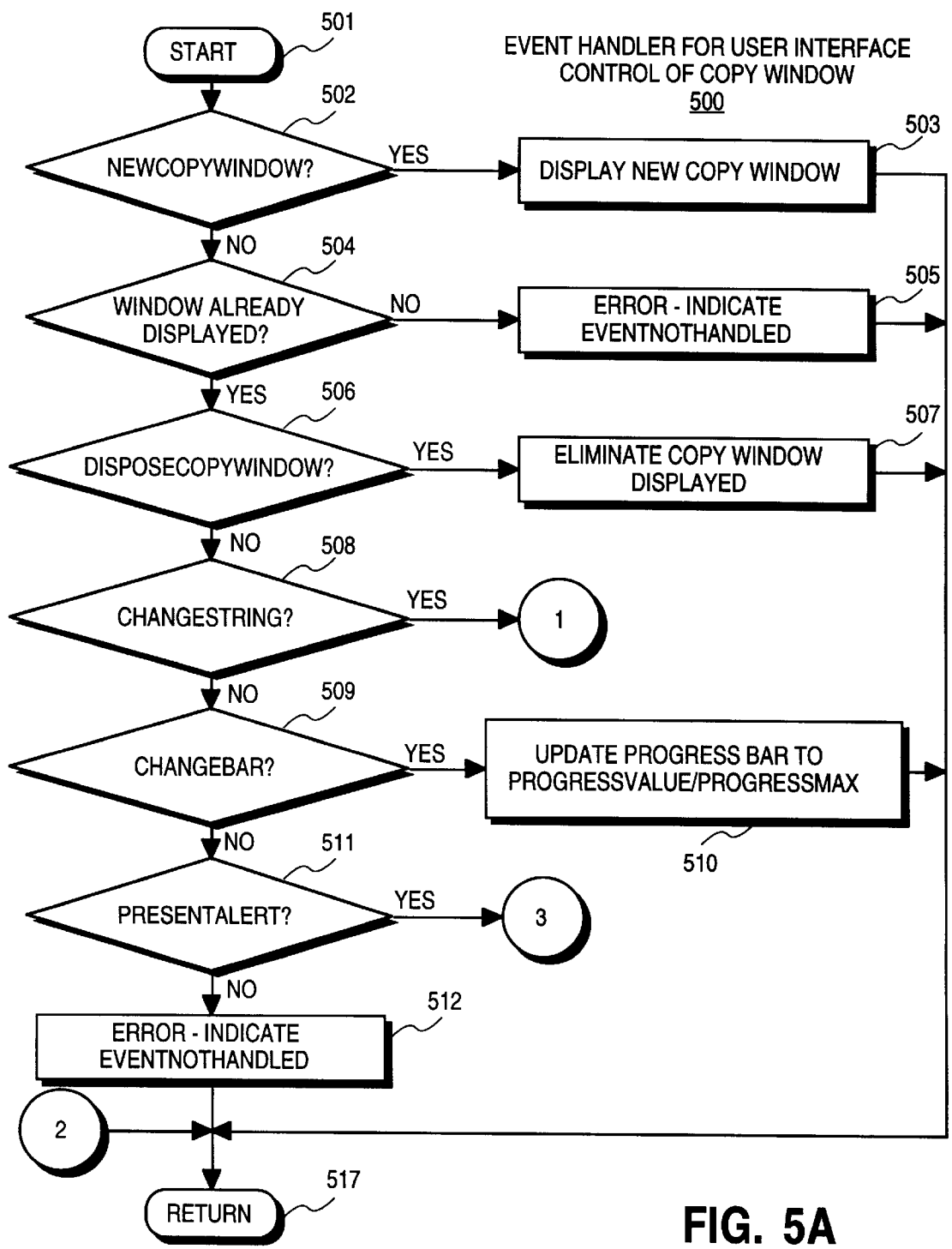
FIGS. 5a–5c show process flow diagrams of an event handler which is registered for use by a server application program to service events generated by a client application program for user interface control.
Figure 5B:
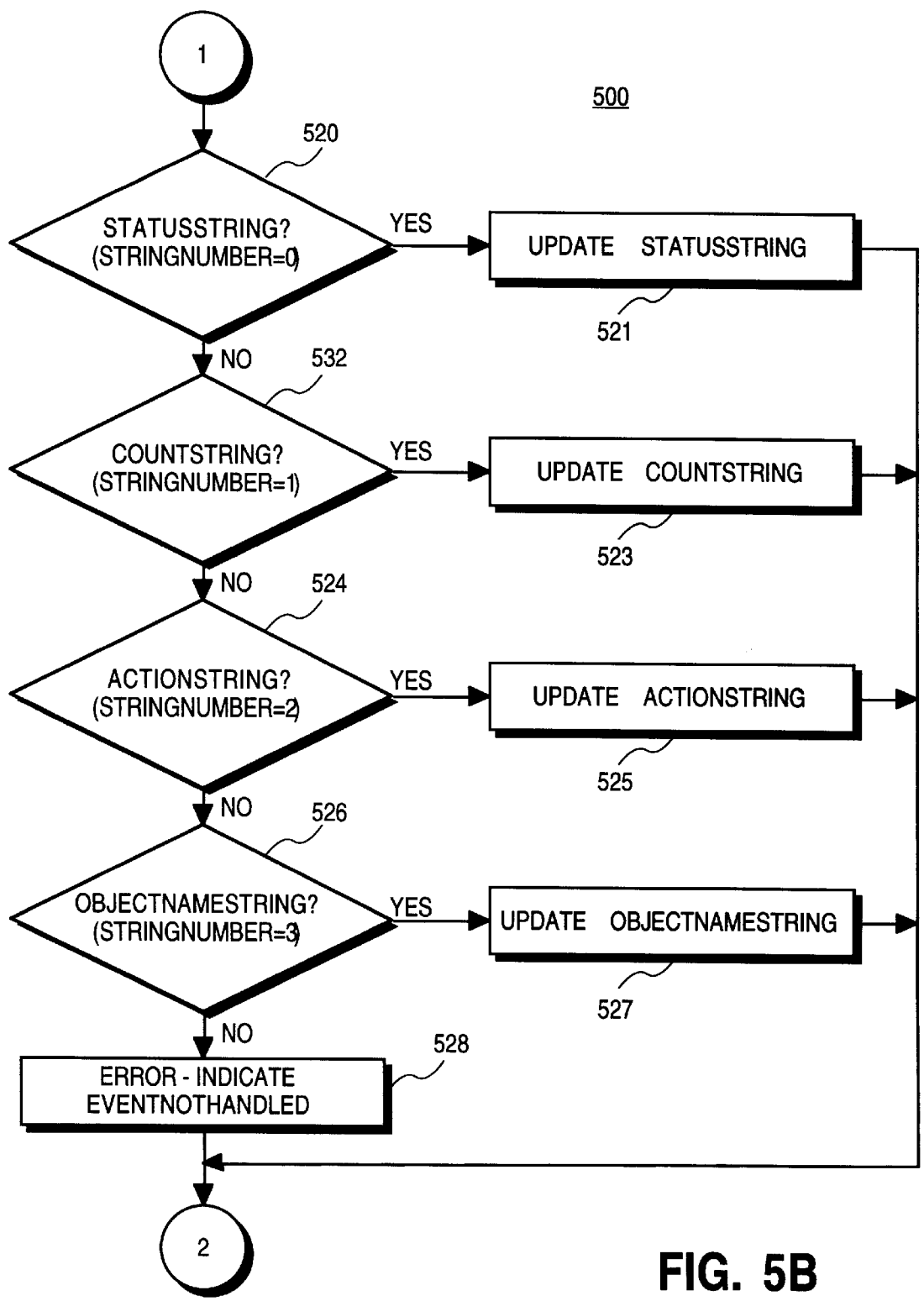

Upon the detection of a ChangeString event, as detected at step 508, then process 500 proceeds to a more detailed sequence of steps to determine the value passed within the string number, as reflected on Figure 5*b*. As is illustrated in FIG. 5*b*, it is determined using a condition checking loop, such as a CASE statement or other programming construct, what the value of stringNumber is. For example, at step 520, it is determined whether stringNumber indicates that the statusString should be modified. If so, then statusString 410 on display 400 is updated at step 521, and the handler returns at step 517. If, however, the countString is specified at step 522 (when stringNumber=1), then the count string (e.g., 420) is updated at step 523, and the handler returns at step 517. If, however, the actionString should be modified (stringNumber=2), as detected at step 524, then it is updated on the copy window. If, however, stringNumber=3 indicating that objectNameString 440 is sought to be updated, as detected at step 526, then objectNameString 440 is updated at step 527, and handler 500 returns at step 517 of FIG 5*a*. Any other string number results in an error being generated at step 528, and a return from the handler at step 517 with an appropriate error event message to client 310, such as "EventNotHandled," indicating that the handler did not service the event.

Process 500 of FIG. 5*a* proceeds to step 509 if a ChangeString event was not detected. Step 509 determines whether the ChangeBar event has been detected. If so, then handler 500 proceeds to step 510 which updates progress bar 450 using the progressvalue and progressMax parameters passed in the event. If the value(s) passed are invalid, an error may be indicated via a response event and the update to the progress bar abort.

Figure 5C:
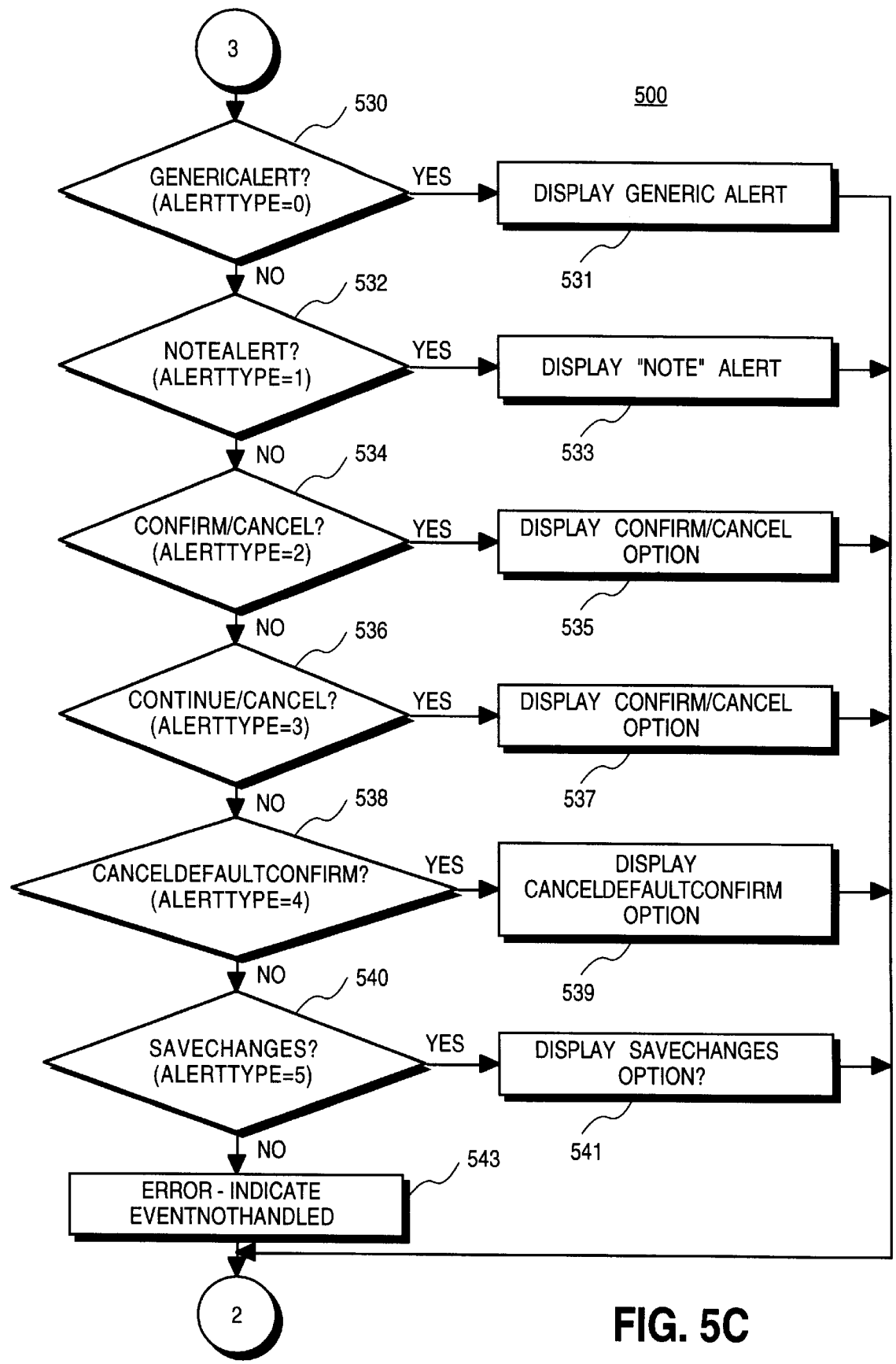

If, however, the ChangeBar event is not detected at step 509, then the handler proceeds to determine whether a PresentAlert event has been detected at step 511. Various types of alerts can then be checked for, as illustrated in FIG 5*c*, by checking the alertType parameter. For example, each of the steps illustrated at steps 530–540 on FIG. 5*c* may be conformed using a typical high-level programming construct such as a CASE statement. Then, upon detection of the corresponding value in the alertType parameter, the associated alert is displayed. For instance, for alertType=0, as detected at step 530, the generic alert is tested for and then displayed at step 531. At step 532, the NoteAlert is tested for (with alertType=1) and displayed at step 533. At step 534, the Confirm/Cancel alert is tested for (with the alertType=2), and it is displayed if detected at step 535. At step 536, if the Continue/Cancel alert type is detected (alertType=3), then the Confirm/Cancel option window is displayed at step 537. At step 538, the CancelDef aultConfirm option is tested for (alertType=4), and the corresponding option is displayed at step 539. Finally, the SaveChanges parameter is tested for (alertType=5) at step 540 and then displayed at step 541. If any other alertType value is detected, an error is indicated at step 543, and the process returns at step 517 of FIG. 5*a*. Otherwise, upon completion of detection of any of the above alertType values, then the option previously displayed is saved for use when the next event is detected in the event handler at step 542, and process 500 returns at step 517 of FIG. 5*b*.

At any rate, upon detection of the all the previous events, if the events are serviced, then an event message from server 330 to client 310 such as EventHandled is issued, and handler 500 returns at step 517. Otherwise, any events detected which do not fall into one of the categories tested for or other events which are not serviced may issue a suitable error event message, such as EventNotHandled at step 517 to indicate to client 310 that the event was not serviced. Then, the client may take appropriate actions via its own event handler.

Thus, an invention for a background application controlling the user interface of a foreground application has been described. Although the present invention has been described particularly with reference to specific embodiments as illustrated in FIGS. 1–5*c*, it may be appreciated by one skilled in the art that many departures and modifications may be made by one of ordinary skill in the art without departing from the general spirit and scope of the present invention.

What is claimed is:

1. In a computer system comprising a processor, a display, a memory, a user input device, a first process operative in the computer system, a second process operative in the computer system as a foreground process and a user interface on said computer system display under the control of the second process, a method for the first process to perform operations for the second process and control a content of the user interface on said computer system display, said content under control of the foreground second process operative in said computer system, said first process controlling the content to display information regarding the operations performed by the first process for the second process, said method comprising the following steps:

a. installing an event handling process as part of said second process, said event handling process when said second process is operative in said computer system, servicing events generated by the first process for controlling said user interface display under control of said second process;

b. said second process initiating said first process to perform operations for said second process, said second process operative in the foreground and said first process operative in the background;

d. said first process generating events for controlling said user interface display while the second process remains as a foreground process and the first process is a background process, said events providing information regarding the operations performed by said first process for the second process; and e. said event handling process receiving events generated by said first process, said event handling process updating said user interface on said computer system display according to said events generated by said first process, while said first process remains in the background, and received by said event handling process.

\* \* \* \* \*